June 16, 1936. W. F. ALDER 2,043,984
PORTABLE CLOSED CHAMBER DETERMINATION OF SOUND ABSORPTION
Filed July 20, 1932 3 Sheets-Sheet 1
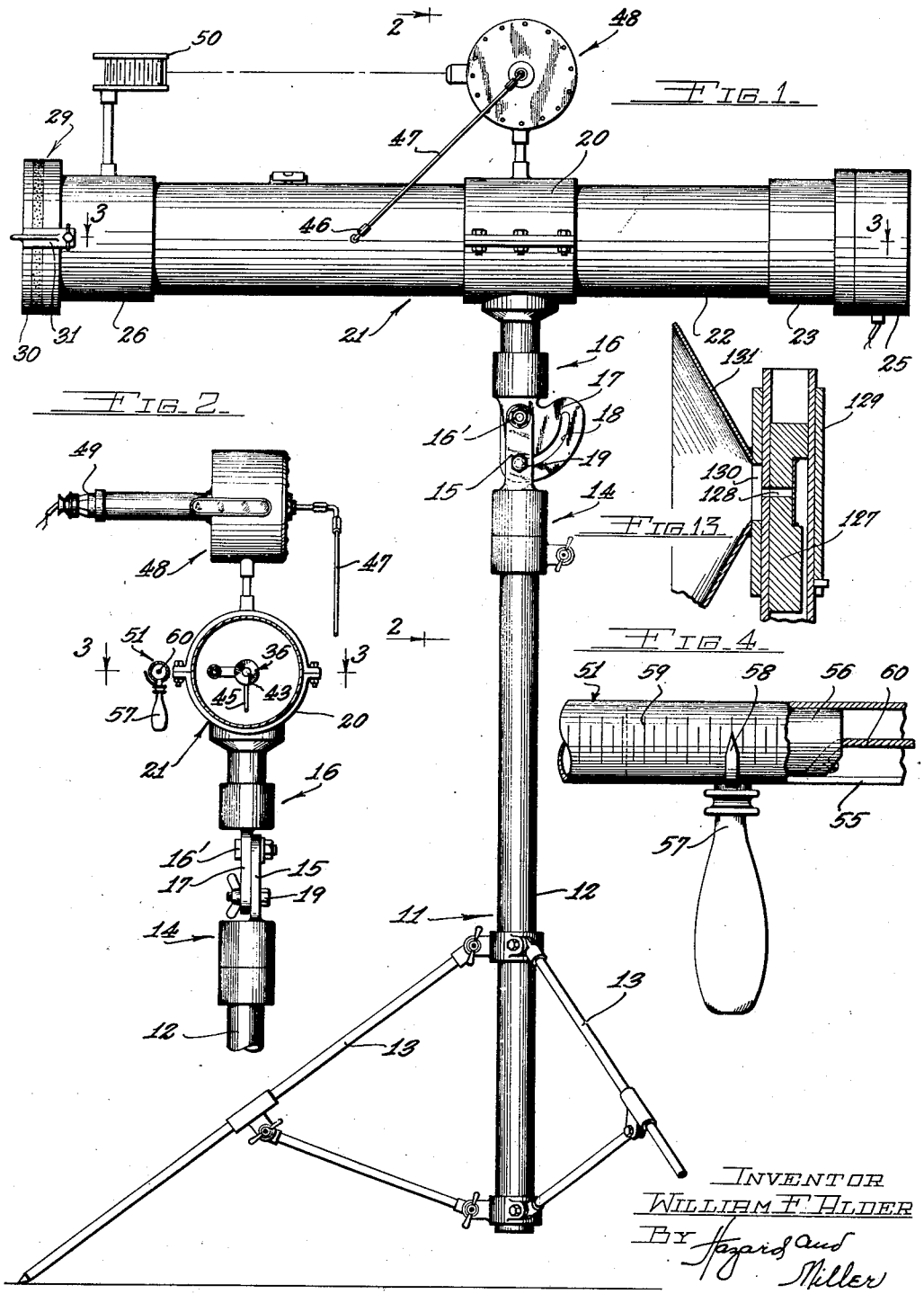

June 16, 1936.  W. F. ALDER  2,043,984
PORTABLE CLOSED CHAMBER DETERMINATION OF SOUND ABSORPTION
Filed July 20, 1932  3 Sheets-Sheet 2
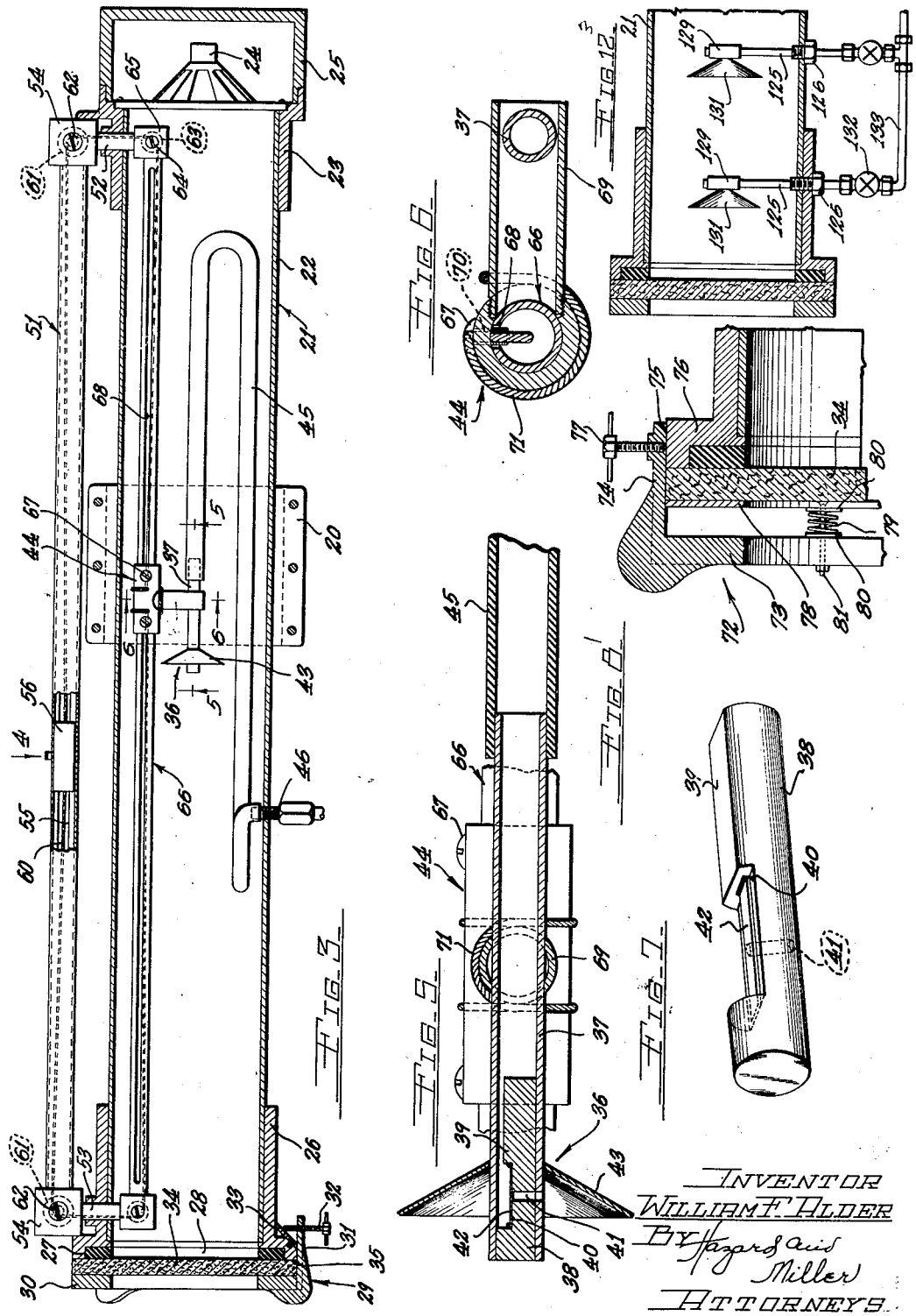
INVENTOR
WILLIAM F. ALDER
BY Hazard and Miller
ATTORNEYS

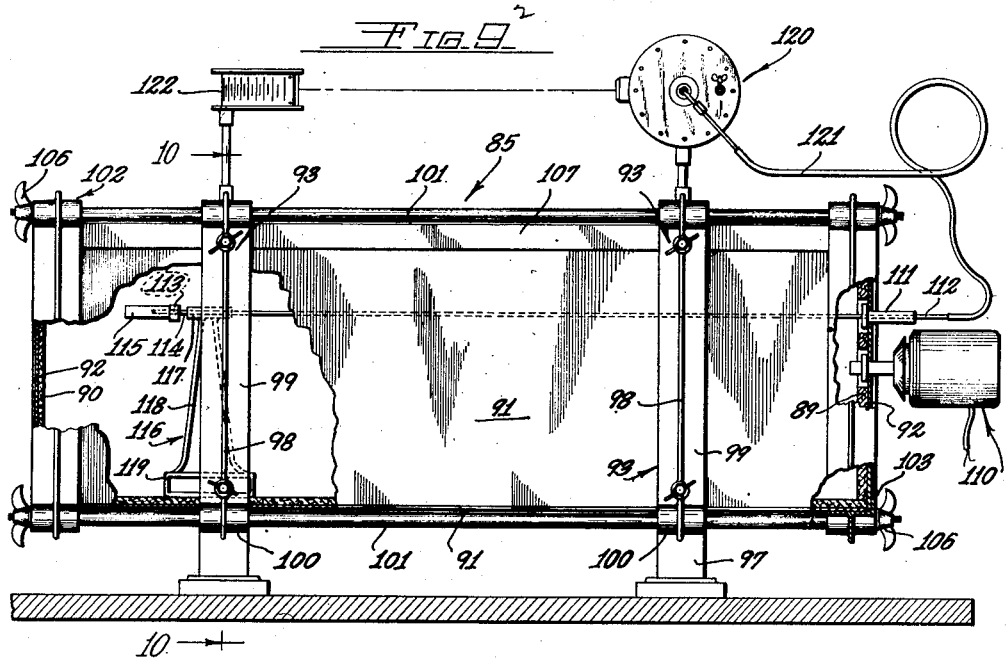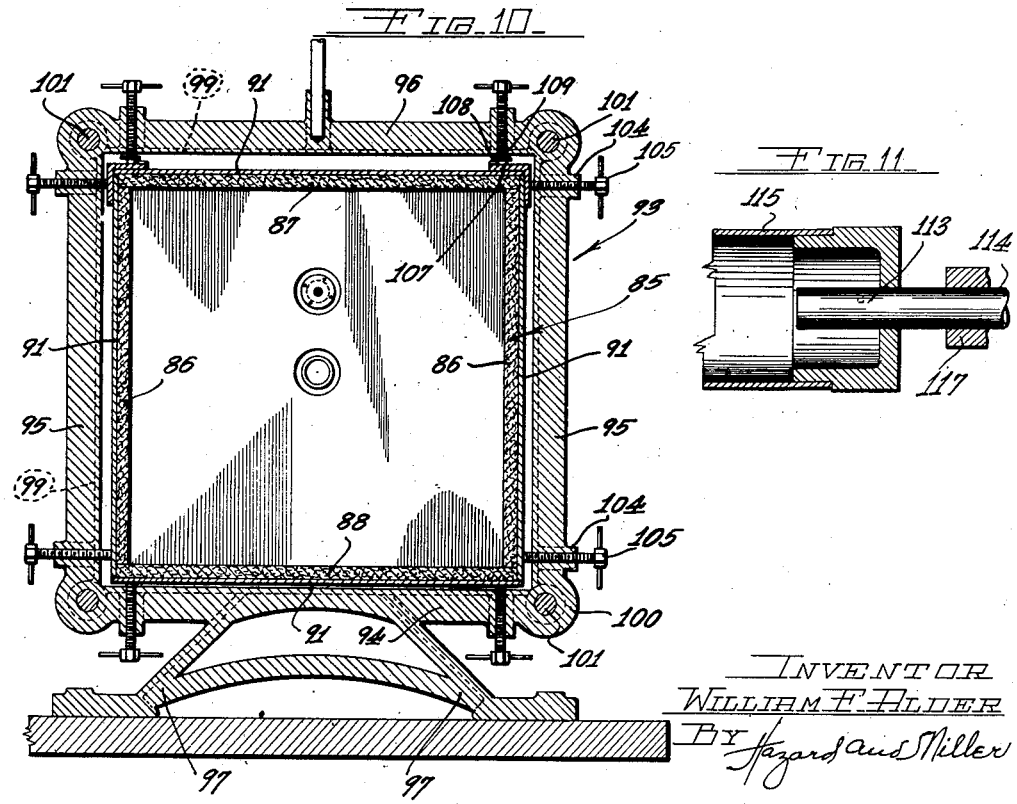

Patented June 16, 1936

2,043,984

UNITED STATES PATENT OFFICE 2,043,984

PORTABLE CLOSED CHAMBER DETERMINATION OF SOUND ABSORPTION

William F. Alder, Altadena, Calif., assignor, by mesne assignments, to Jenness A. Alder, Altadena, Calif.

Application July 20, 1932, Serial No. 623,570

10 Claims. (Cl. 73—51)

My invention relates to an apparatus by which, in a portable and closed chamber structure, the absorption of sound may be tested. The invention pertains to testing material for sound absorption, such material being mounted or located in the closed chamber, or the chamber being closed by placing the portable device with one end closed by a wall or other structure, the sound absorption of which is to be tested.

In my present invention, an object and feature thereof is the development and use of sounds in a closed chamber, in which chamber at least one of the sides or ends, preferably the end, has a sample of the material to be tested. However, my invention also comprehends a closed chamber in which substantially all of the sides and at least one end are formed of material to be tested for its sound absorption.

Another object and feature of my invention in determining sound absorption and sound characteristics in a closed chamber is by use of a mechanical sound amplitude meter in which a rectifying valve is utilized to build up sound pressure in the meter due to the condensation portions of the sound wave and in which the valve may be moved inside of the closed chamber to bring the valve into coincidence with the nodes and loops or so-called antinodes or ventral sections of the sound waves. The pressure built up by the rectified sound waves is led outside of the chamber to the sound amplitude meter. Therefore, by comparative tests, the sound absorption characteristics of material to be tested may be obtained.

My invention further comprehends the use of a portable closed chamber in which, for instance, the end may be closed by a totally sound reflecting material, which material may be tested with sounds of different pitches or frequencies and also different amplitudes or loudness, and by moving the rectifying valve internally of the chamber a position of one or more nodes may be obtained and, hence, the characteristics of this totally sound reflecting material may be obtained at the portions of the sound wave having the greatest degree of change of condensation rarefaction and, therefore, obtain the maximum reading in the sound meter. The sound meter is connected to the valve internally of the sound chamber by means of a flexible air hose and outside of the chamber by a pipe connection.

After making a series of tests with a standard sound reflecting material mounted, for instance, at one end of an elongated tubular closed chamber, various sound absorbing materials may be placed at this closed end and mounted in the same manner as the standard reflector of sound. Readings may then be obtained showing the maximum pressure developed in the sound meter at the nodes for the same frequencies and amplitudes and thus comparative data may be obtained showing the reflection of the sound absorbing materials, and, hence, indicate the degree of absorption of such materials.

Another feature of my invention relates to making the elongated tube with sides first of good sound reflecting materials and the end also of similar reflecting material and then substituting walls or materials and also material at the end which has a characteristic of absorbing sounds. This enables a test to be made of a closed chamber having all of its walls formed of sound absorbing material, the sound source being mounted at one end of the tube.

Further features of my invention from the mechanical standpoint relate to the construction of the closed chamber tube and the arrangement for mounting samples to be tested at the end and on the sides. Other mechanical features relate to the mounting of the rectifying valve on a longitudinal guide track inside of a tube and moving this by an external appliance on the outside of the tube. With this I provide external graduations by which the position of the nodes and loops may be determined and a record made of these for sounds of different pitch, for different degrees of intensity of sound, and for different materials.

As regards the sound meter, I may utilize one constructed along the general lines set forth in my patent applications for: Apparatus and method for determining amplitude of sound, filed October 22, 1931, Serial No. 570,486; and Acoustic testing apparatus and method of operation, filed March 9, 1932, Serial No. 597,828. My invention as a whole may be considered as a further development along the line of determining sound amplitudes and acoustic testing using a closed instead of open chambers as in the prior applications.

Another detailed feature of the invention relates to the construction of a rectifying valve, this employing as a check valve a thin wafer in the form of a metal strip closing an air passage, this wafer being in the nature of metallic leaf, such as bronze leaf or the like.

My invention is illustrated in the accompanying drawings, in which:

Fig. 1 is a side elevation of one form of my instrument.

Fig. 2 is a transverse section on the line 2—2 of Fig. 1 in the direction of the arrows.

Fig. 3 is a horizontal section on the line 3—3 of Figs. 1 or 2.

Fig. 4 is a detail elevation taken in the direction of the arrow 4 of Fig. 3.

Fig. 5 is a detail longitudinal section on the line 5—5 of Fig. 3 in the direction of the arrows, illustrating the rectifying valve and the mounting therefor.

Fig. 6 is a detailed transverse section on the line 6—6 of Fig. 3 in the direction of the arrows.

Fig. 7 is a perspective view of the rectifying valve.

Fig. 8 is a longitudinal section through a modified sample holder.

Fig. 9 is a side elevation partly broken away of an alternative form of my instrument for lining all sides with samples.

Fig. 10 is a vertical transverse section on the line 10—10 of Fig. 9 in the direction of the arrows.

Fig. 11 is a detail of the rectifying valve with the valve resonator.

Fig. 12 is a longitudinal section of a modification of Fig. 1 in which the rectifying valves are located in fixed positions at the nodes in the tube.

Fig. 13 is a vertical section through one of the rectifying valves used in Fig. 12.

In connection with my invention, in order to make the device portable and to be able to position it adjacent the wall whose acoustic properties are to be tested, I employ an adjustable stand 11 which has a post 12 and adjusting legs 13. A swivel clamp 14 is located at the upper portion of the post. This is provided with an ear 15 on which is mounted a pivoting head 16 having a pivot bolt 16'. This pivoting head has a segmental plate 17 with an arcuate slot 18 therein, through which extends a clamp screw 19. A clamping collar 20 is secured to this head. In the clamp 20 there is mounted a sound tube 21, this forming an enclosed chamber. This tube may be slid longitudinally of the clamp 20. This tube is illustrated as having a cylindrical section 22, at one end of which there is a fixed collar 23 and attached to this end is a sound source, this being a loud speaking unit 24. This unit is enclosed by a cover cap 25.

At the opposite end of the tube there is another collar 26. This has an annular recess 27 therein in which is seated a rubber gasket 28. A removable closure clamp 29 is illustrated as being in the form of a ring 30 having a plurality of longitudinally extending jaws 31, through which jaws extend clamp screws 32, which clamp screws engage beveled metal plates 33 attached to the collar 16. A disk 34 of material to be tested is mounted in the closure clamp 29 and this clamp is designed to compress the rubber gasket until there is a contact between the material and the end of the collar 26 on the line 35. This always gives the tube a fixed length.

The disk of material to be tested may obviously be changed and to obtain a basic reading a total reflecting medium, such as a heavy metal disk, is inserted, forming an end closure for the tube opposite the sound source. In order to explore the interior of the tube to obtain the position of the nodes and loops when the tube is responding in resonance with the sound source, that is, with the loud speaker, a movable rectifying valve 36 is utilized. This valve is illustrated as being mounted in an air tube 37 having a closure plug 38 at one end. One side of this plug is flattened as indicated at 39, forming an air passage between this flattened side and the side of the tube 37. There is a deeper recess 40 forming a valve seat and an air duct 41 leading from this valve seat through the plug and through the tube 37. The valve element 42 comprises an extremely thin strip of metal, such as metal foil, of the nature of bronze or gold leaf, which is secured at its opposite ends in the recess 40 and extends over the inner end of the air duct 41. This functions to allow the compressed air on condensation of part of the sound wave to enter the sound tube 37 before this valve strip closes on the rarefaction part of the sound wave. It therefore, acts as a rectifying valve, allowing building up of pressure in the tube 37 corresponding to the condensation half of the sound wave only. In order to collect the sound wave, a reflector 43 is attached on the outside of the tube 37.

The tube 37 is mounted in a longitudinal, movable carrier designated by the assembly numeral 44, and from the end of the tube 37 opposite the rectifying valve there is a rubber or flexible hose 45 which connects with an outlet 46 through the wall of the tube 21. From this outlet there is a fixed air tube 47 which leads to a sound meter 48. This meter, as above described, may be of the same character as set forth in my patent applications above mentioned, in which there is an air chamber with a flexible diaphragm at one side, which diaphragm is expanded by the building up of the condensation parts of the sound wave and causes a beam of light from a light source 49 to be reflected by a mirror on to a graduated scale 50. The sound meter is, preferably, mounted on the collar 20 and the scale on the end collar 26.

The valve 36 and the tubing connected thereto may have the pressure released by slow leakage as by the valve in my copending application Serial No. 570,486; or may employ a release valve on the sound meter as illustrated in my copending application Serial No. 597,828, mentioned above.

In order to move the valve and to be able to indicate the exact position of the inlet opening or duct 41 of such valve, I employ a scale tube 51 which is attached at one end by a tube 52 extending through the collar 23 and the tube 22 and by a second tube 53 extending through the tube 22 in the collar 26. There is a rectangular housing 54 connecting the tubes 52, 53, and the scale tube 51. This scale tube has a longitudinal slot 55 in the bottom and in this tube there is a plug 56, to which plug is connected a depending handle 57, which handle has a pointer finger 58 which partly encircles the tube 51 from the bottom and operates along a scale 59 on the outside of the tube. This scale is preferably graduated in metric measure but may be in the English measurements.

Pulling cables 60 are secured to opposite ends of the plug 56 and these cables extend over guide pulleys 61 mounted on the axle pins 62 which extend through the rectangular housings 54. These guide cables then pass through the tubes 52 and 53 and again are turned by guide pulleys 63 on axle pins 64 in small rectangular housings 65, these housings being attached to the inner ends of the tubes 52 and 53. Connecting the housings 65 there is a tubular guide track 66 for the carrier 44, which carrier is tubular and has a plurality of pins 67 extending therethrough and into a longitudinal slot 68 in the track 66. This prevents the carrier from rotating and holds the radial bracket 69 which is secured to this carrier and extends toward the axial center of the tube 22 in rigid position. The sound tube 37 connected to the rectifying valve is mounted on the inner end of the bracket 69 and is in the axial center of the tube 22. The pulling cable passes through the center of the tube 66 and passes outwardly through a perforation 70 in the carrier and through the slot 68 and has a loop 71 formed around the body of the carrier and the bracket 69. This allows the cable to be made in one section with the ends only attached to the plug 56.

It will, therefore, be seen that on moving the handle 57, the plug 56 is slid longitudinally in the scale tube 51. This moves the cable and the carrier 44 moves in an opposite direction to that of the handle. This action, therefore, locates the rectifying valve at any desired position in the tube 22 and for a sound of a given pitch with which the tube 22 is in resonance the valve may be moved until by the maximum reading on the scale 50 the nodes can be ascertained and, if desired, by a minimum reading the location of the loops can be found.

In the operation of the instrument for making a test of material, as above mentioned, the test is first made of material having sound reflecting qualities with but little absorption, such as a metal plate, and a reading will be obtained, for instance, with the inlet to the rectifying valve at one of the nodes with the same pitch sound and with the same intensity. A test will then be made of material having sound absorbing qualities and by the readings on the scale 50 comparison may be made of the absorbing characteristics of such material, as, manifestly, the greater proportion of sound is absorbed by the material under test the less is the intensity of the reflected sound and, hence, the less intense will be changes of condensation and rarefaction at the nodes of the sound wave in the end tube 22.

In Fig. 8 I show a modified construction for holding the sample or specimen 34 to be tested. In this case a closure clamp 72 is in the form of a ring 73 with extending jaws 74, these jaws engaging the peripheral surface 75 of the flange 76 attached to the cylindrical tube. Set screws 77 hold this clamp in place. In order to obtain a substantially even pressure on different samples or specimens, a pressure ring 78 engages the marginal edge of the sample 34 and this is held in place by a compression spring 79, such spring being fitted on washers 80 between the rings 78 and 73, there being a bolt 81 to hold the assembly in position. The head of the bolt is preferably countersunk in the ring 78. By this construction a substantially uniform pressure by the springs may be given to all samples.

In the construction of Figs. 9 and 10, I employ a sound chamber 85. This chamber is in the form of rectangular box. This has a lining on two sides 86, the top 87, bottom 88, the sound receiving end 89, and the remote end 90 of the material which is to be tested for its sound absorption qualities. The material is, preferably, backed by metal plates 91 at the sides and 92 at the ends.

In order to form a convenient structure for mounting different samples I employ a pair of frames 93. Each of these frames is rectangular, having a base member 94, two side members 95, and a top 96. Legs 97 are connected to the bottom member. Each of these members is preferably formed with a web 98 and a pair of opposite flanges 99. Each of these members of the rectangular frame has a corner hub-like structure 100 and through each of these extends a rod or bar 101, these rods having a close sliding fit in the hub structures. The end frames 102 are of a similar type but have an inturned flange 103 to engage the metal plates at the end of the structure. In each of the frames 93 there are bosses 104 through which extend clamping screws 105, which screws bear on the outside of the side plates. Each rod 101 at the end is threaded and is provided with a wing nut 106 by which the ends can be clamped tightly in place. At the upper corners of the box there are angles 107. These angles have split fingers 108 secured thereto, which fingers engage a contracted neck 109 on the screws extending through the top bar 96 of the frames 93. Therefore, these upper two angles may be suspended while the specimens to be tested are being inserted. The ends can both be removed so that the samples of materials for testing, after being cut to the proper size, may be readily inserted in the frames 93, the metal outside plates being fitted in place and the whole structure securely clamped to make a comparatively tight closed chamber structure.

A source of sound is indicated by the sound generator 110. This is attached to one end of the closed chamber, being secured to the metal plate at this end, the specimen being cut away adjacent the horn end of this sound generator. A bushing 111 is secured, preferably, to the same end of the box and through this slides a straight sound tube 112. This tube carries a sound rectifying valve 113 at the end, which valve is preferably the type illustrated in Figs. 5 and 7, except that the air inlet is through a small pipe 114 at the end and it is provided with a resonator 115. A carriage or support 116 (note Fig. 9) is provided for the rectifying valve. This has a sleeve 117 in which the valve fits, a web 118, and a pair of skids 119. This whole carriage is made of light metal with sections cut out to reduce weight where possible.

The sound amplitude meter 120 is mounted on one of the frames 93 and is connected to the sound tube 112 by a flexible hose 121. This sound meter may be the same as that illustrated in Fig. 1 and of the type of my patent applications above mentioned. The light from this meter is reflected on to a scale 122 which may, preferably, be mounted on one of the frames 93.

In the manner of operating this closed sound chamber system of testing materials for their sound absorption or sound reflecting qualities, tests are preferably first made with highly reflecting materials, such as the metal sides and end closures, this being to establish a basis of substantially no sound absorption. The different materials to be tested are built in the frame to make up the closed chamber. The materials should preferably all be the same character for each test. Then tests may be made using sounds of different frequencies and also changing the amplitude of sounds for such frequencies. The sound tube 112 may be thrust in and out through the bushing 111, this sliding quite easily and bringing the intake opening of the rectifying valve into a position preferably to register the highest air pressure developed. It is comparatively easy by moving the tube backwards and forwards and watching the light on the scale to determine the nodes and the loops and the place of maximum pressure for each definite frequency. A recording is then made of the different readings on the scale, and, as above mentioned, a large number of different frequencies of sound may be used and the amplitude varied to obtain a complete tabulation of characteristics of the particular material as to its sound absorption and reflecting characteristics. It will be seen by this construction of apparatus that quite large pieces of material may be tested at one time, a convenient size being to have the chamber about four feet long and about two feet on a side.

In addition to using the closed chamber structure and method of procedure for testing materials, I may use this type of chamber for testing sound producers, such as loud speakers, to obtain the characteristics, or various elements of the electrical equipment, such as transformers used in connection with loud speakers and amplifiers. For instance, I may provide the chamber either with a poor sound absorption inner surface or have this absorbent as desired. A loud speaker to be tested may, for instance, be subjected to a constant frequency of sound and the amplitude of this sound varied. From readings obtained a curve may be plotted, showing the action of the loud speaker under these conditions of a steady frequency and a varying amplitude, or, again, if desired, the amplitude may be constant, that is, the loudness of the sound covered by the electrical current supply, the frequency may be varied and again readings obtained and a curve plotted.

The closed chamber structure may also be used for testing electrical equipment used in connection with loud speakers, as, for instance, the transformers, in which case a loud speaking unit with known characteristics may be used with a transformer to be connected and tests may be run through conditions having a constant frequency and varying amplitude or, again, a condition of constant amplitude and varied frequency.

The valve used in the construction of Figs. 9 and 10 may be the same as that illustrated in detail in Fig. 5, and the resonator 115 is substituted for the reflector 43 of Fig. 5. It is desirable to substitute different resonators for the specific frequency of sound developed in the closed chamber.

In the construction of Figs. 12 and 13 I may use the sound tube 21 which in the cylindrical section 22 has a series of sound conducting pipes 125 inserted therein and has an air tight seal by the clamping nuts 126. Each of these tubes has a rectifying valve 127 mounted therein, which valve may be of the same construction as shown in Figs. 5 and 7, and is illustrated as having an air duct 128 leading through the valve and the pipe 125 carrying the valve. A sleeve 129 fits over the tube 125 having a snug sliding fit. This tube has an air opening 130 and has a sound reflector 131 connected to the sleeve surrounding the opening. This directs the sound toward the inlet opening of the valve.

Each of the pipes 125 is connected to a closure valve 132 and each valve is connected to a common manifold 133. These manifolds lead to the sound meter 48 as shown in Fig. 1 and by actuating the valves 132 one or more of the rectifying valves may be connected to the manifold and, hence, to the sound meter.

In making tests with this type of instrument, the sound tube is tested with sounds of different established frequencies in order to obtain the position of the nodes and loops. Pipes, each with a rectifying valve, are inserted through the sound tube in positions to locate the rectifying valves at the position of maximum pressures for the differently pitched sounds. Materials to be tested are, therefore, subjected to sounds of established pitches and all of the rectifying valves which are not to be used for any particular pitch are disconnected from the manifold by closing the valves 132. Hence, sound amplitude measurements may be obtained for different materials for different distinct pitches using rectifying valves in fixed positions and, hence, an analysis of the sound absorption and reflection characteristics of different samples may be obtained.

Various changes may be made in the details of construction without departing from the scope of the invention as defined by the appended claims.

I claim:

1. A device for determining sound characteristics comprising a closed chamber, means to develop a sound at one portion of the chamber, means including a valve responsive to sound waves movable in the chamber to accumulatively build up a pressure, and a sound amplitude meter connected thereto.

2. A device for determining sound characteristics comprising a closed chamber, means to develop a sound in said chamber, a valve responsive to sound waves, means to move said valve to different positions in said chamber, means to indicate externally the position of the valve in the chamber, and a sound amplitude meter exterior to the chamber connected to the valve.

3. A device for determining sound characteristics comprising an elongated closed chamber, means for developing a sound at one end of the chamber, a sound wave rectifying valve movable longitudinally in said chamber, and a sound amplitude meter operatively connected to said valve to show the cumulative air pressure due to sound at different positions longitudinally of the chamber.

4. A device for determining sound characteristics comprising an elongated chamber closed at both ends and having means for supporting samples to be tested at one end and a source of sound at the opposite end, a sound wave rectifying valve mounted in the chamber, means exterior to the chamber to move said valve to various positions longitudinally of the chamber, a sound amplitude meter mounted in a fixed position exterior of the chamber, a flexible connection in the chamber between the valve and a connection to said meter, and means exterior to the chamber to indicate the position of the valve in the chamber.

5. A device for determining sound characteristics comprising an elongated chamber closed at both ends and having means for changeably supporting samples to be tested at one end and a source of sound at the opposite end, a sound wave rectifying valve mounted in the chamber, means exterior to the chamber to move said valve to various positions longitudinally thereof, a sound amplitude meter mounted in a fixed position exterior to the chamber, a connection, part of which is flexible, between the valve and said meter.

6. A device as claimed in claim 5, the means to support the samples being removable from the end of the chamber, and means to mount the chamber whereby the open end of the chamber may be placed against the face of a wall.

7. A device for determining sound characteristics comprising an elongated tube having a closed end with a source of sound mounted therein, a removable closure for the opposite end having means to support samples to be tested and adapted to be completely removed for exposure of the open end, a sound wave rectifying valve slidably mounted in said tube, means exterior of the tube to move said valve longitudinally, a sound amplitude meter exterior of the chamber, a connection from the valve to the meter, part of which is flexible, a stand to support the tube, said stand being adapted for location of the open end of the tube contiguous to a wall surface.

8. A device for determining sound characteristics comprising a structure forming an elongated closed chamber with a source of sound at one end of the chamber, means whereby samples may be inserted in the sides and ends of the chamber structure, a sound wave rectifying valve mounted in the chamber, means to move said valve longitudinally of the chamber, a sound amplitude meter exterior to the chamber, a connection from the valve to the meter, part of which is flexible.

9. A device for determining sound characteristics comprising a frame structure having detachable side and end plates adapted to form an elongated closed chamber, a sound source at one of the ends thereof, means to clamp the plates and the samples to be tested to form a closed chamber with the samples forming the interior walls thereof, a sound wave rectifying valve in the chamber, means to adjust said valve longitudinally of such chamber, a sound amplitude meter exterior to said frame, a connection from the valve to the meter, part of which is flexible.

10. A device for determining sound characteristics comprising a closed chamber having a sound source at one end, a sound wave rectifying valve movably mounted in said chamber, with means exterior to the chamber to move said valve, a flexible air tube connected to the valve, a fixed outlet connected to the end of the tube opposite the valve, a sound amplitude meter having an expansible air chamber with an air passage from said fixed outlet, and means operable by the expansion of air in said chamber to indicate the sound characteristics.

WILLIAM F. ALDER.